(12) United States Patent
Chandrasekar et al.

(10) Patent No.: US 11,625,419 B2
(45) Date of Patent: Apr. 11, 2023

(54) SYSTEMS AND METHODS FOR DATA EXTRACTION FROM ELECTRONIC DOCUMENTS USING DATA PATTERNS

(71) Applicant: FMR LLC, Boston, MA (US)

(72) Inventors: Punitha Chandrasekar, Bangalore (IN); Sourav Karmakar, Kolkata (IN); Amol Vinayak Jadhav, Bangalore (IN); Bidhan Roy, Bangalore (IN); Victor S. Y. Lo, Lexington, MA (US); Varun Vivek Aher, Bangalore (IN); Ankit Garg, Bangalore (IN)

(73) Assignee: FMR LLC, Boston, MA (US)

( * ) Notice: Subject to any disclaimer, the term of this patent is extended or adjusted under 35 U.S.C. 154(b) by 373 days.

(21) Appl. No.: 17/064,150

(22) Filed: Oct. 6, 2020

(65) Prior Publication Data

US 2022/0107964 A1   Apr. 7, 2022

(51) Int. Cl.
| | |
|---|---|
| *G06F 16/28* | (2019.01) |
| *G06F 16/93* | (2019.01) |
| *G06F 40/186* | (2020.01) |
| *G06F 16/22* | (2019.01) |
| *G06V 30/416* | (2022.01) |

(52) U.S. Cl.
CPC ............ *G06F 16/285* (2019.01); *G06F 16/22* (2019.01); *G06F 16/93* (2019.01); *G06F 40/186* (2020.01); *G06V 30/416* (2022.01)

(58) Field of Classification Search
CPC ........ G06F 16/285; G06F 16/22; G06F 16/93; G06F 40/186; G06V 30/416
See application file for complete search history.

(56) References Cited

U.S. PATENT DOCUMENTS

| | | |
|---|---|---|
| 10,235,681 B2 | 3/2019 | Chang et al. |
| 2017/0213469 A1 | 7/2017 | Elchik et al. |
| 2019/0065840 A1 | 2/2019 | Saxena et al. |

*Primary Examiner* — Truong V Vo
(74) *Attorney, Agent, or Firm* — Cesari & McKenna, LLP

(57) ABSTRACT

Systems and methods for extracting data from electronic documents based on data patterns. The method includes receiving electronic template documents. Each template document corresponds to a type of electronic document. The method further includes, for each template document, processing the template document using a text extraction and data processing application. The method also includes, for each template document, determining a data extraction formula corresponding to the type of electronic document. The method further includes, storing the data extraction formula in a first database. The method also includes, receiving an electronic document including user data and a Unicode corresponding to the type of document. The method also includes, processing and classifying the electronic document into the type of document corresponding to the Unicode. The method also includes identifying data elements in the electronic document based on the data extraction formula and extracting data values for each of the identified data elements.

20 Claims, 5 Drawing Sheets

SYSTEMS AND METHODS FOR DATA EXTRACTION FROM ELECTRONIC DOCUMENTS USING DATA PATTERNS

FIELD OF THE INVENTION

The present invention relates generally to systems and methods for extracting data from electronic documents, including systems and methods for extracting data from electronic documents using data patterns.

BACKGROUND OF THE INVENTION

Many organizations use software tools to extract data from electronic documents. When done manually, data extraction from electronic documents may appear to be a simple process. But when an electronic device has to perform this task with high accuracy, most of the software tools fail to extract proper information. There are several software tools in the market that can extract information from electronic document. However, there is a need for a tool which can extract data from a form with different patterns of filling the form.

For example, a single electronic document may have entries with multiple choice options, underlined values, values from tables, underlined values based on the option selected, and default values if nothing is selected, among others. The structure of the form in the electronic documents may differ widely due to various templates used by different vendors or record keepers. Therefore, there is a need for a software tool that is able to extract elements from any type of form from any record keeper with high accuracy and is capable of being applied to various applications of textual information retrieval by providing relevant training data.

SUMMARY OF THE INVENTION

Accordingly, an object of the invention is to provide systems and methods for extracting data from electronic documents. It is an object of the invention to provide systems and methods for extracting data from a form with different data patterns. It is an object of the invention to provide systems and methods for extracting data from a form with different data patterns with high accuracy. It is an object of the invention to provide systems and methods for training a data extraction software tool. It is an object of the invention to provide systems and methods for extracting data from electronic documents using data patterns.

In some aspects, a method for extracting data from electronic documents based on data patterns includes receiving, by a server computing device, electronic template documents. Each of the electronic template documents corresponds to a type of electronic document. The method further includes, for each of the electronic template documents, processing, by the server computing device, the electronic template document using a text extraction and data processing application. The method also includes, for each of the electronic template documents, determining, by the server computing device, a data extraction formula corresponding to the type of electronic document. Further, the method includes, storing, by the server computing device, the data extraction formula for each of the electronic template documents in a first database. The method also includes, receiving, by the server computing device, an electronic document including user data and a Unicode corresponding to the type of electronic document.

The method further includes, processing, by the server computing device, the electronic document using the text extraction and data processing application. The method also includes, classifying, by the server computing device, the electronic document into the type of electronic document corresponding to the Unicode. Further, the method includes identifying, by the server computing device, data elements in the electronic document based on the data extraction formula corresponding to the type of electronic document. The method also includes, extracting, by the server computing device, data values for each of the identified data elements in the electronic document. The method further includes generating, by the server computing device, a second database including the data values for each of the identified data elements in the electronic document and locations of the identified data elements.

In some embodiments, the data extraction formula corresponds to locations of data elements in the electronic template document. In other embodiments, classifying the electronic document into the type of electronic document is further based on an organization corresponding to the type of electronic document. In some embodiments, the locations of the identified data elements correspond to a page number of the electronic document. In other embodiments, the server computing device is further configured to receive the electronic template documents from data sources.

In some embodiments, processing the electronic template document includes identifying, by the server computing device, a header and a footer based on a similarity score, and removing, by the server computing device, the header and footer from the electronic template document.

In other embodiments, processing the electronic document includes identifying, by the server computing device, a header and a footer based on a similarity score, and removing, by the server computing device, the header and footer from the electronic document.

In some embodiments, identifying the data elements in the electronic document further includes calculating, by the server computing device, a cosine similarity score based on the electronic document and the electronic template document corresponding to the document type, and benchmarking, by the server computing device, the cosine similarity scores.

In some aspects, a system for extracting data from electronic documents based on data patterns includes a server computing device communicatively coupled to a first database and a second database over a network. The server computing device is configured to receive electronic template documents. Each of the electronic template documents corresponds to a type of electronic document. The server computing device is also configured to, for each of the electronic template documents, process the electronic template document using a text extraction and data processing application. Further, the server computing device is configured to, for each of the electronic template documents, determine a data extraction formula corresponding to the type of electronic document. The server computing device is also configured to store the data extraction formula for each of the electronic template documents in the first database. The server computing device is further configured to receive an electronic document including user data and a Unicode corresponding to the type of electronic document.

The server computing device is also configured to process the electronic document using the text extraction and data processing application. Further, the server computing device is configured to classify the electronic document into the type of electronic document corresponding to the Unicode.

The server computing device is further configured to identify data elements in the electronic document based on the data extraction formula corresponding to the type of electronic document. The server computing device is also configured to extract data values for each of the identified data elements in the electronic document. Further, the server computing device is configured to generate the second database including the data values for each of the identified data elements in the electronic document and locations of the identified data elements.

In some embodiments, the data extraction formula corresponds to locations of data elements in the electronic template document. In other embodiments, classifying the electronic document into the type of electronic document is further based on an organization corresponding to the type of electronic document. In some embodiments, the locations of the identified data elements correspond to a page number of the electronic document. In other embodiments, the server computing device is further configured to receive the electronic template documents from data sources.

In some embodiments, the server computing device is further configured to process the electronic template document by identifying a header and a footer based on a similarity score, and remove the header and footer from the electronic template document.

In other embodiments, the server computing device is further configured to process the electronic document by identifying a header and a footer based on a similarity score, and remove the header and footer from the electronic document.

In some embodiments, the server computing device is further configured to identify the data elements in the electronic document by calculating a cosine similarity score based on the electronic document and the electronic template document corresponding to the document type, and benchmarking the cosine similarity scores.

In some aspects, a method for extracting data from electronic documents based on data patterns includes receiving, by a server computing device, an electronic document including user data and a Unicode corresponding to the type of electronic document. The method further includes identifying, by the server computing device, a header and a footer of the electronic document based on a similarity score. The method also includes removing, by the server computing device, the identified header and footer from the electronic document based on the similarity score.

The method further includes, classifying, by the server computing device, the electronic document into the type of electronic document corresponding to the Unicode. Further, the method includes identifying, by the server computing device, data elements in the electronic document based on a data extraction formula corresponding to the type of electronic document. The method also includes, extracting, by the server computing device, data values for each of the identified data elements in the electronic document. The method further includes generating, by the server computing device, a database including the data values for each of the identified data elements in the electronic document and locations of the identified data elements.

In some embodiments, the data extraction formula corresponds to locations of data elements in the electronic template document. In other embodiments, classifying the electronic document into the type of electronic document is further based on an organization corresponding to the type of electronic document.

In some embodiments, identifying the data elements in the electronic document includes calculating, by the server computing device, a cosine similarity score based on the electronic document and an electronic template document corresponding to the document type, and benchmarking, by the server computing device, the cosine similarity scores.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for extracting data from electronic documents. The system and methods can include mechanisms or methods for extracting data from a form having different data patterns. The systems and methods described herein can provide systems and methods for extracting data from a form with different data patterns with high accuracy. The systems and methods described herein can include one or more mechanisms or methods for training a data extraction software tool. The systems and methods described herein can facilitate users with systems and methods for extracting data from electronic documents using data patterns.

Figure 1:
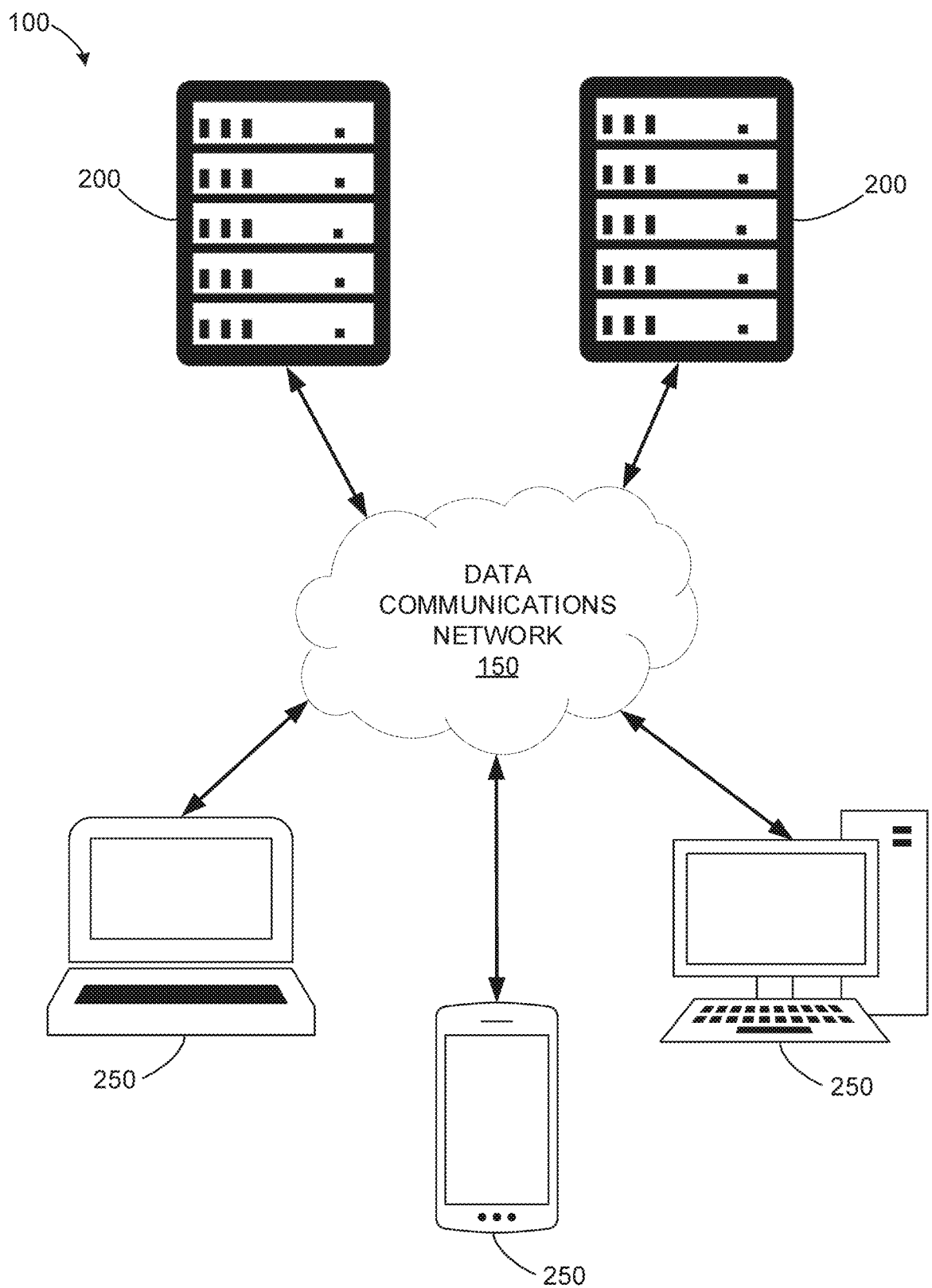
FIG. 1 is a block diagram of an exemplary data communications network, according to embodiments of the technology described herein.
Figure 2:
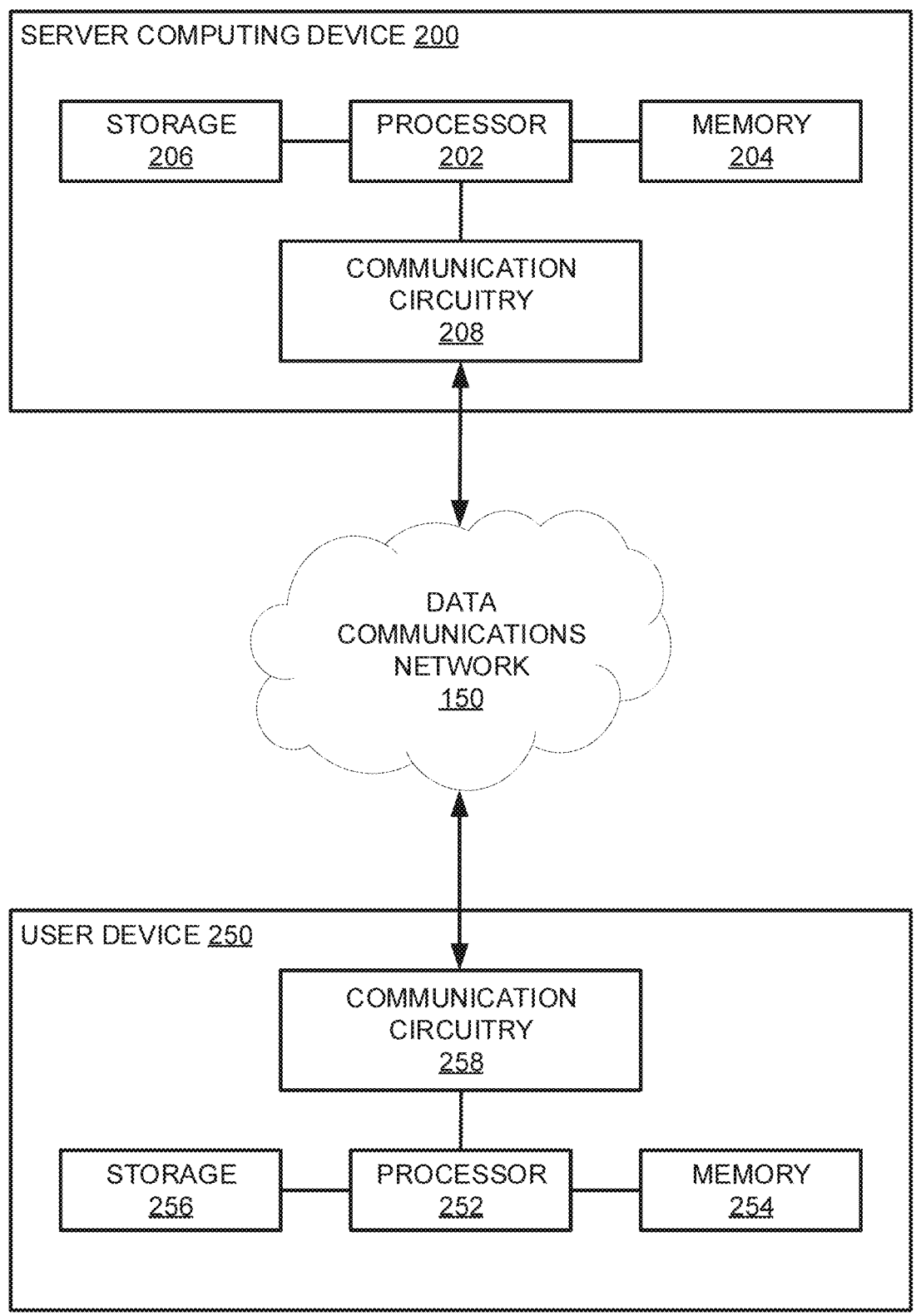
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
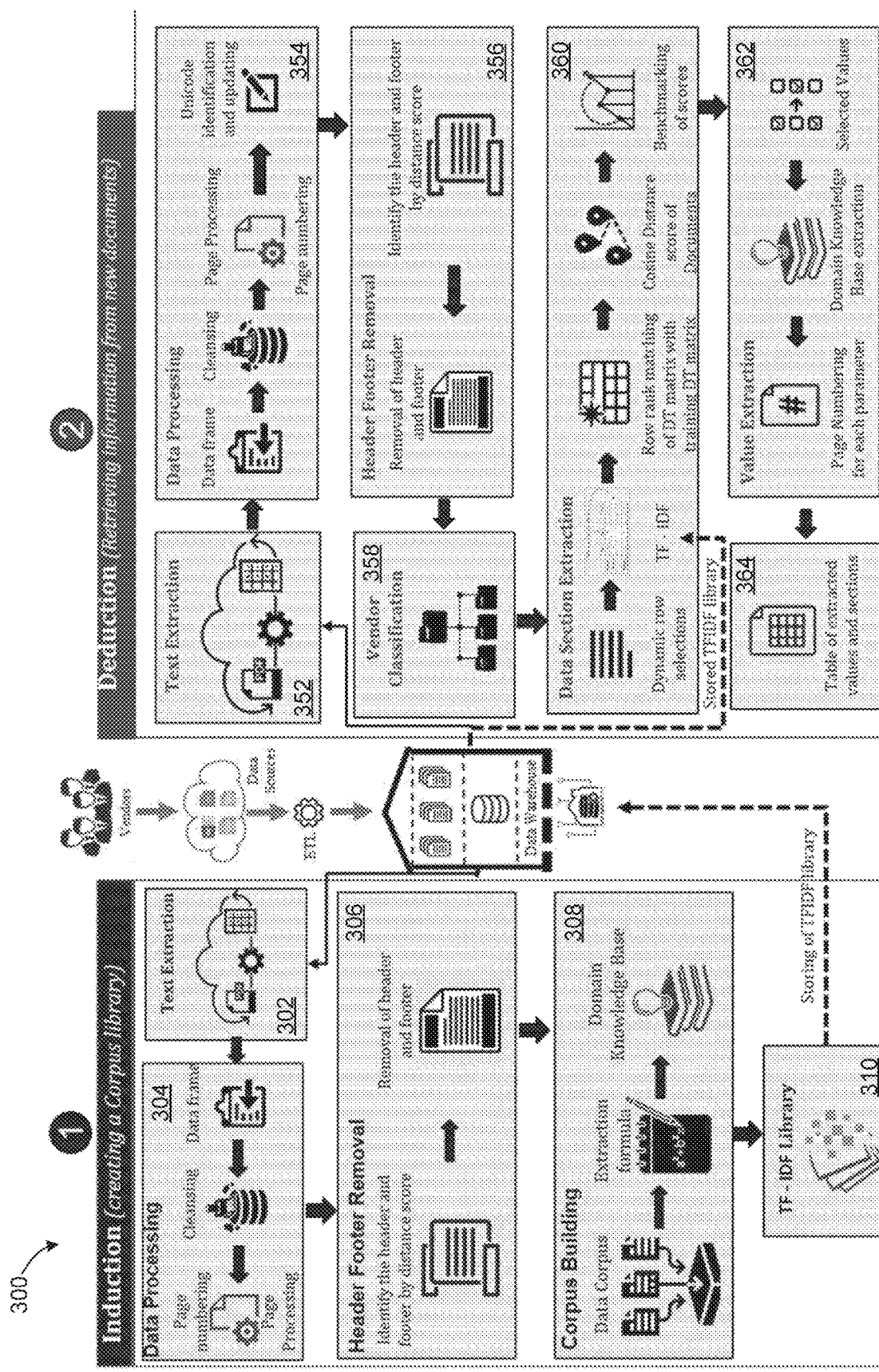
FIG. 3 is a diagram showing a visualization of an exemplary architecture for extracting data from electronic documents, according to embodiments of the technology described herein.

An exemplary architecture 300 for extracting data from electronic documents using communications system 100 is illustrated in FIG. 3. Architecture 300 is agnostic of structure and can extract information from electronic documents including forms which include a combination of text, check boxes, underlined values, etc. Architecture 300 is powered by machine learning and natural language processing and uses a novel approach of similarity scoring based on cosine similarity and row rank matching from a Document Term Matrix. In general, architecture 300 identifies the relevant section from the document for each element/parameter and, from the identified section, the value is extracted based on the selection type, i.e., if it is multiple choice, underlined value, or both.

Architecture 300 includes induction modules configured to create a corpus library and deduction modules configured to retrieve data from new electronic documents. The induction modules of architecture 300 include text extraction module 302, data processing module 304, header footer removal module 306, corpus building module 308, and TF-IDF library 310. The text extraction module 302 is configured to receive electronic template documents from one or more data sources. The data processing module 304 is configured to process the electronic template documents in order to prepare the electronic template documents for header and footer removal. The header and footer removal module 306 is configured to identify and remove the header and footers by distance score (i.e., a type of similarity matching). Once the header and footer has been removed, the corpus building module 308 is configured to determine a data extraction formula corresponding to a type of electronic document. For example, in some embodiments, the data extraction formula corresponds to locations of data elements in the electronic template document. The data extraction formula is then stored in the TF-IDF library 310 in order to be used by the deduction modules for data extraction.

The deduction modules of architecture 300 include text extraction module 352, data processing module 354, header footer removal module 356, vendor classification module 358, data section extraction module 360, value extraction module 362, and table generation module 364. The text extraction module 352 is configured to receive electronic documents which include user data and a Unicode corresponding to the type of electronic document. The data processing module 354 is configured to process the electronic documents in order to prepare the electronic documents for header and footer removal. The header and footer removal module 356 is configured to identify and remove the header and footers by distance score. Once the header and footer has been removed from the electronic document, the vendor classification module 358 is configured to classify the electronic document with a corresponding vendor or record keeper based on the Unicode.

Based on the classification, the data section extraction module 360 is configured to identify data elements in the electronic document based on the data extraction formula corresponding to the type of electronic document. For example, the data extraction module 360 is configured to calculate a cosine similarity score using row rank matching of the Document Term Matrix and benchmark the cosine similarity scores in order to identify the data elements. The cosine similarity score is based on the electronic document and the electronic template document corresponding to the document type. The value extraction module 362 is configured to extract data values for each of the identified data elements in the electronic document. The table generation module 364 is configured to generate a table including the data values for each of the identified data elements in the electronic document and locations of the identified data elements. For example, in some embodiments, the locations of the identified data elements correspond to a page number of the electronic document.

Figure 4:
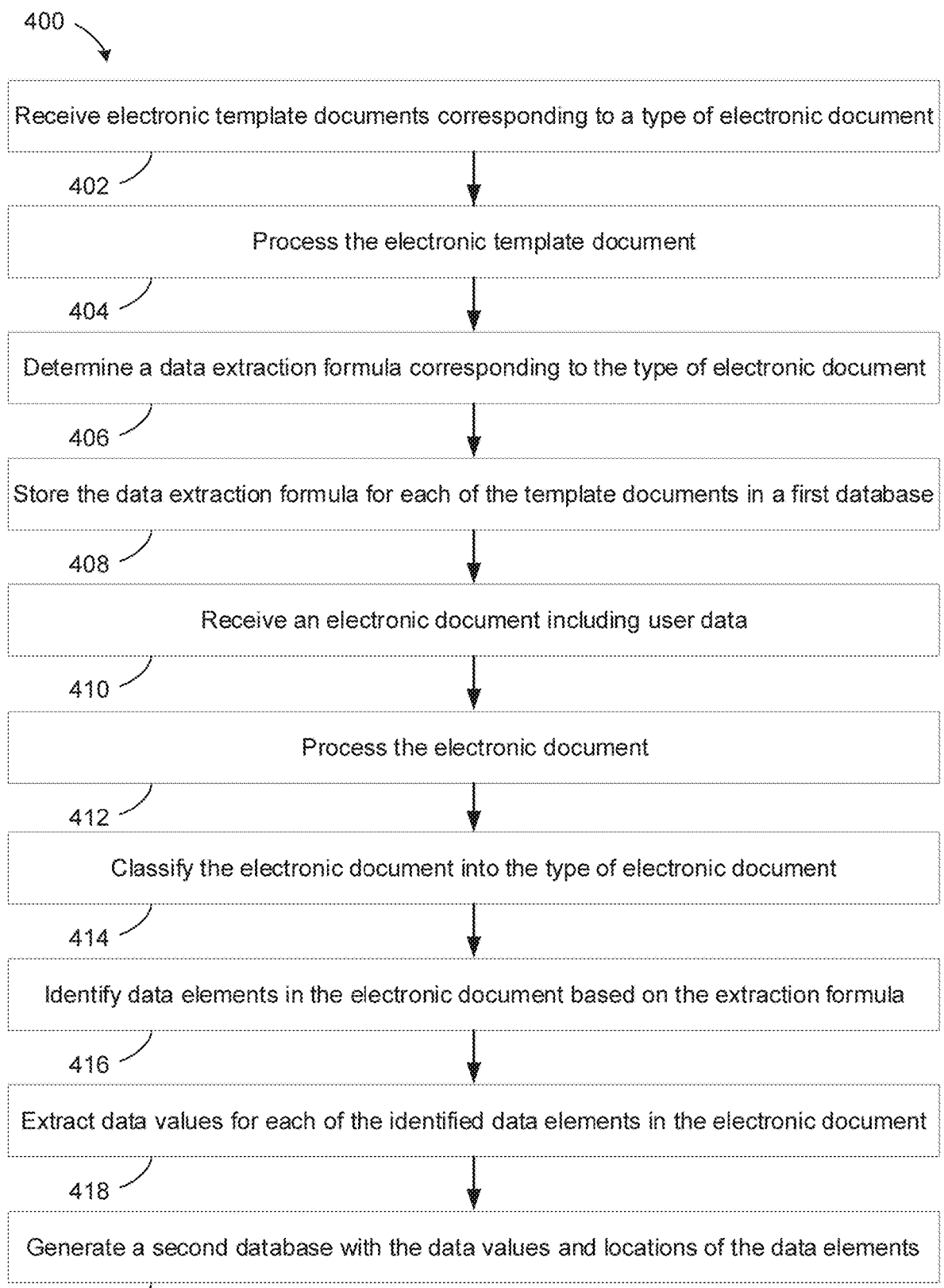
FIG. 4 is a flow diagram of a computer-implemented method for extracting data from electronic documents using the data extraction architecture of FIG. 3, according to embodiments of the technology described herein.
Figure 5:
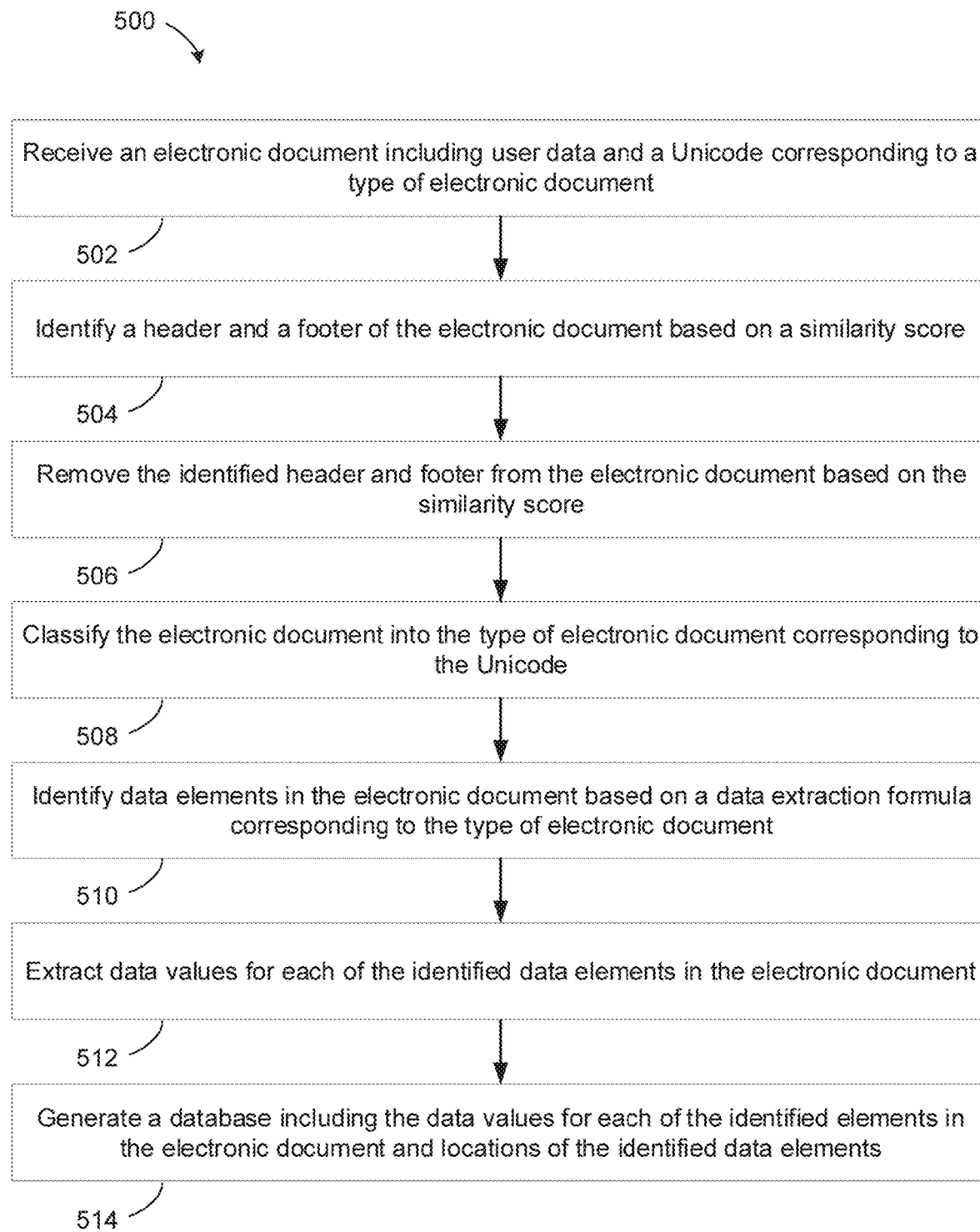
FIG. 5 is a flow diagram of a computer-implemented method for extracting data from electronic documents based on a plurality of data patterns, according to embodiments of the technology described herein.

Architecture 300 allows for data extraction from forms having a combination of, for example, text, underlined values, and check boxes. Additionally, architecture 300 supports different types of forms from different record keepers. Further, architecture 300 is a unique architecture using a novel method of similarity score calculation involving cosine similarity with row rank matching of Document Term Matrix. The similarity score calculation improves section identification and text extraction from electronic documents. FIGS. 4 and 5 illustrate exemplary processes for extracting data from electronic document using the induction and deduction modules of architecture 300. Specifically, FIG. 4 illustrates an exemplary process 400 employing both of the induction and deduction modules of architecture 300, while FIG. 5 illustrates an exemplary process 500 employing only the deduction modules of architecture 300.

Referring to FIG. 4, a process 400 for extracting data from electronic documents based on data patterns using architecture 300 is illustrated. The process 400 begins by receiving, by a server computing device 200, electronic template documents in step 402. Each electronic template document corresponds to a type of electronic document. For example, in some embodiments, the server computing device 200 is further configured to receive the electronic template documents from one or more data sources.

Process 400 continues by, for each of the electronic template documents, processing, by the server computing device 200, the electronic template document using a text extraction and data processing application in step 404. For example, in some embodiments, the server computing device 200 is further configured to process the electronic template document by identifying a header and a footer based on a similarity score and removing the header and footer from the electronic template document.

Process 400 continues by, for each of the electronic template documents, determining, by the server computing device 200, a data extraction formula corresponding to the type of electronic document in step 406. For example, in some embodiments, the data extraction formula corresponds to locations of data elements in the electronic template document. Process 400 continues by, storing, by the server computing device 200, the data extraction formula for each of the electronic template documents in a first database in step 408.

Process 400 continues by, receiving, by the server computing device 200, an electronic document including user data and a Unicode corresponding to the type of electronic document in step 410. In some embodiments, the server computing device 200 is configured to receive an electronic document comprising plan information in a form like structure containing check boxes, underlines, multiple choices, tables, and plain text. Process 400 continues by, processing, by the server computing device 200, the electronic document using the text extraction and data processing application in step 412. For example, in some embodiments, the server computing device 200 is further configured to process the electronic document by identifying a header and a footer based on a similarity score and removing the header and footer from the electronic document.

Process 400 continues by, classifying, by the server computing device 200, the electronic document into the type of electronic document by utilizing a similarity-based approach in step 414. For example, in some embodiments, classifying the electronic document into the type of electronic document is further based on an organization corresponding to the type of electronic document. Process 400 continues by, identifying, by the server computing device 200, data elements in the electronic document based on the data extraction formula corresponding to the type of electronic document in step 416. For example, in some embodiments, the server computing device 200 is further configured to calculate a cosine similarity score based on the electronic document and the electronic template document corresponding to the document type and benchmark the cosine similarity scores.

Process 400 continues by, extracting, by the server computing device 200, data values for each of the identified data elements in the electronic document in step 418. Process 400 finishes by generating, by the server computing device 200, a second database including the data values for each of the identified data elements in the electronic document and locations of the identified data elements in step 420. For example, in some embodiments, the locations of the identified data elements correspond to a page number of the electronic document.

In some aspects, process 400 can be implemented on a system for extracting data from electronic documents based on data patterns. The system includes a server computing device 200 communicatively coupled to first database and a second database over a network 150. The server computing device 200 is configured to receive electronic template documents. Each electronic template document corresponds to a type of electronic document. The server computing device 200 is also configured to, for each of the electronic template documents, process the electronic template document using a text extraction and data processing application. The server computing device 200 is further configured to, for each of the electronic template documents, determine a data extraction formula corresponding to the type of electronic document. The server computing device 200 is also configured to store the data extraction formula for each of the electronic template documents in the first database.

Further, the server computing device 200 is configured to receive an electronic document including user data and a Unicode corresponding to the type of electronic document. The server computing device 200 is also configured to process the electronic document using the text extraction and data processing application. Further, the server computing device 200 is configured to classify the electronic document into the type of electronic document corresponding to the Unicode. The server computing device 200 is further configured to identify data elements in the electronic document based on the data extraction formula corresponding to the type of electronic document. The server computing device 200 is also configured to extract data values for each of the identified data elements in the electronic document. Further, the server computing device 200 is configured to generate the second database including the data values for each of the identified data elements in the electronic document and locations of the identified data elements.

Referring to FIG. 5, a process 500 for extracting data from electronic documents based on data patterns using architecture 300 is illustrated. The process 500 begins by receiving, by the server computing device 200, an electronic document including user data and a Unicode corresponding to a type of electronic document in step 502. Process 500 continues by, identifying, by the server computing device 200, a header and a footer of the electronic document based on a similarity score in step 504. Process 500 continues by, removing, by the server computing device 200, the identified header and footer from the electronic document based on the similarity score in step 506.

Process 500 continues by, classifying, by the server computing device 200, the electronic document into the type of electronic document corresponding to the Unicode in step 508. For example, in some embodiments, classifying the electronic document into the type of electronic document is further based on an organization corresponding to the type of electronic document. Process 500 continues by, identifying, by the server computing device 200, data elements in the electronic document based on a data extraction formula corresponding to the type of electronic document in step 510. For example, in some embodiments, the server computing device 200 is further configured to calculate a cosine similarity score based on the electronic document and the electronic template document corresponding to the document type and benchmark the cosine similarity scores.

Process 500 continues by, extracting, by the server computing device 200, data values for each of the identified data elements in the electronic document in step 512. Process 500 finishes by generating, by the server computing device 200, a database including the data values for each of the identified data elements in the electronic document and locations of the identified data elements in step 514. For example, in some embodiments, the locations of the identified data elements correspond to a page number of the electronic document.

In some aspects, process 500 can be implemented on a system for extracting data from electronic documents based on data patterns. The system includes a server computing device 200 communicatively coupled to a database over a network 150. The server computing device 200 is configured to receive an electronic document including user data and a Unicode corresponding to the type of electronic document. The server computing device 200 is also configured to identify a header and a footer of the electronic document based on a similarity score. The server computing device 200 is further configured to remove the identified header and footer from the electronic document based on the similarity score.

Further, the server computing device 200 is configured to classify the electronic document into the type of electronic document corresponding to the Unicode. The server computing device 200 is further configured to identify data elements in the electronic document based on a data extraction formula corresponding to the type of electronic document. The server computing device 200 is also configured to extract data values for each of the identified data elements in the electronic document. Further, the server computing device 200 is configured to generate the database including the data values for each of the identified data elements in the electronic document and locations of the identified data elements.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for extracting data from electronic documents based on a plurality of data patterns, the method comprising:
   receiving, by a server computing device, a plurality of electronic template documents, wherein each electronic template document corresponds to a type of electronic document;
   for each of the plurality of electronic template documents, processing, by the server computing device, the electronic template document using a text extraction and data processing application;
   for each of the plurality of electronic template documents, determining, by the server computing device, a data extraction formula corresponding to the type of electronic document;
   storing, by the server computing device, the data extraction formula for each of the plurality of electronic template documents in a first database;
   receiving, by the server computing device, an electronic document comprising user data and a Unicode corresponding to the type of electronic document;
   processing, by the server computing device, the electronic document using the text extraction and data processing application;
   classifying, by the server computing device, the electronic document into the type of electronic document corresponding to the Unicode;
   identifying, by the server computing device, data elements in the electronic document based on the data extraction formula corresponding to the type of electronic document;
   extracting, by the server computing device, data values for each of the identified data elements in the electronic document; and
   generating, by the server computing device, a second database comprising the data values for each of the identified data elements in the electronic document and locations of the identified data elements.

2. The computerized method of claim 1, wherein processing the electronic template document comprises:
   identifying, by the server computing device, a header and a footer based on a similarity score; and
   removing, by the server computing device, the header and footer from the electronic template document.

3. The computerized method of claim 1, wherein the data extraction formula corresponds to locations of data elements in the electronic template document.

4. The computerized method of claim 1, wherein processing the electronic document comprises:
   identifying, by the server computing device, a header and a footer based on a similarity score; and
   removing, by the server computing device, the header and footer from the electronic document.

5. The computerized method of claim 1, wherein classifying the electronic document into the type of electronic document is further based on an organization corresponding to the type of electronic document.

6. The computerized method of claim 1, wherein identifying the data elements in the electronic document further comprises:
   calculating, by the server computing device, a cosine similarity score based on the electronic document and the electronic template document corresponding to the document type; and
   benchmarking, by the server computing device, the cosine similarity scores.

7. The computerized method of claim 1, wherein the locations of the identified data elements correspond to a page number of the electronic document.

8. The computerized method of claim 1, wherein the server computing device is further configured to receive the plurality of electronic template documents from a plurality of data sources.

9. A system for extracting data from electronic documents based on a plurality of data patterns, the system comprising:
   a server computing device communicatively coupled to a first database and a second database over a network, the server computing device configured to:
   receive a plurality of electronic template documents, wherein each electronic template document corresponds to a type of electronic document;
   for each of the plurality of electronic template documents, process the electronic template document using a text extraction and data processing application;
   for each of the plurality of electronic template documents, determine a data extraction formula corresponding to the type of electronic document;
   store the data extraction formula for each of the plurality of electronic template documents in the first database;
   receive an electronic document comprising user data and a Unicode corresponding to the type of electronic document;
   process the electronic document using the text extraction and data processing application;
   classify the electronic document into the type of electronic document corresponding to the Unicode;
   identify data elements in the electronic document based on the data extraction formula corresponding to the type of electronic document;
   extract data values for each of the identified data elements in the electronic document; and
   generate the second database comprising the data values for each of the identified data elements in the electronic document and locations of the identified data elements.

10. The system of claim 9, wherein the server computing device is further configured to process the electronic template document by:

identifying a header and a footer based on a similarity score; and removing the header and footer from the electronic template document.

11. The system of claim 9, wherein the data extraction formula corresponds to locations of data elements in the electronic template document.

12. The system of claim 9, wherein the server computing device is further configured to process the electronic document by:

identifying a header and a footer based on a similarity score; and removing the header and footer from the electronic document.

13. The system of claim 9, wherein classifying the electronic document into the type of electronic document is further based on an organization corresponding to the type of electronic document.

14. The system of claim 9, wherein the server computing device is further configured to identify the data elements in the electronic document by:

calculating a cosine similarity score based on the electronic document and the electronic template document corresponding to the document type; and benchmarking the cosine similarity scores.

15. The system of claim 9, wherein the locations of the identified data elements correspond to a page number of the electronic document.

16. The system of claim 9, wherein the server computing device is further configured to receive the plurality of electronic template documents from a plurality of data sources.

17. A computerized method for extracting data from electronic documents based on a plurality of data patterns, the method comprising:

receiving, by the server computing device, an electronic document comprising user data and a Unicode corresponding to a type of electronic document;

identifying, by the server computing device, a header and a footer of the electronic document based on a similarity score;

removing, by the server computing device, the identified header and footer from the electronic document based on the similarity score;

classifying, by the server computing device, the electronic document into the type of electronic document corresponding to the Unicode;

identifying, by the server computing device, data elements in the electronic document based on a data extraction formula corresponding to the type of electronic document;

extracting, by the server computing device, data values for each of the identified data elements in the electronic document; and generate, by the server computing device, a database comprising the data values for each of the identified data elements in the electronic document and locations of the identified data elements.

18. The computerized method of claim 17, wherein the data extraction formula corresponds to locations of data elements in the electronic template document.

19. The computerized method of claim 17, wherein classifying the electronic document into the type of electronic document is further based on an organization corresponding to the type of electronic document.

20. The computerized method of claim 1, wherein identifying the data elements in the electronic document further comprises:

calculating, by the server computing device, a cosine similarity score based on the electronic document and an electronic template document corresponding to the document type; and benchmarking, by the server computing device, the cosine similarity scores.

* * * * *